US009400150B2

United States Patent
Stewart et al.

(10) Patent No.: US 9,400,150 B2
(45) Date of Patent: Jul. 26, 2016

(54) METHODS AND SYSTEMS FOR ENHANCING FIREARM SAFETY THROUGH WIRELESS NETWORK MONITORING

(71) Applicant: Gunnegate, LLC, Capitola, CA (US)

(72) Inventors: Robert J Stewart, Soquel, CA (US); Joaquin Menezes, Capitola, CA (US)

(73) Assignee: Yardarm Technologies, Inc., Capitola, CA (US)

( * ) Notice: Subject to any disclaimer, the term of this patent is extended or adjusted under 35 U.S.C. 154(b) by 0 days.

(21) Appl. No.: 13/913,478

(22) Filed: Jun. 9, 2013

(65) Prior Publication Data

US 2014/0290110 A1    Oct. 2, 2014

Related U.S. Application Data

(60) Provisional application No. 61/853,179, filed on Apr. 1, 2013, provisional application No. 61/853,971, filed on Apr. 16, 2013, provisional application No. 61/825,985, filed on May 21, 2013.

(51) Int. Cl.
| | |
|---|---|
| *F41A 17/00* | (2006.01) |
| *F41A 17/06* | (2006.01) |
| *E05B 45/00* | (2006.01) |
| *E05B 45/06* | (2006.01) |
| *F41A 17/08* | (2006.01) |

(52) U.S. Cl.
CPC ............ *F41A 17/063* (2013.01); *E05B 45/005* (2013.01); *E05B 45/06* (2013.01); *F41A 17/08* (2013.01)

(58) Field of Classification Search
CPC ....... F41A 17/063; F41A 17/08; E05B 45/06; E05B 45/005
USPC ......................... 42/70.11, 1.01, 106; 340/542
See application file for complete search history.

(56) References Cited

U.S. PATENT DOCUMENTS

| 4,556,872 A | * | 12/1985 | Masoncup | E05B 45/06 340/542 |
| 4,811,578 A | * | 3/1989 | Masoncup | E05B 45/005 340/542 |
| 5,194,845 A | * | 3/1993 | Sirmon | B62H 5/20 200/61.64 |
| 6,223,461 B1 | * | 5/2001 | Mardirossian | F41A 17/06 42/70.11 |
| 6,357,156 B1 | * | 3/2002 | Klebes et al. | 42/70.11 |

(Continued)

FOREIGN PATENT DOCUMENTS

WO    01/84069 A1    11/2001

OTHER PUBLICATIONS

GSM Overview (http://www.telecomspace.com/gsm.html).*

(Continued)

*Primary Examiner* — Michelle R Clement
(74) *Attorney, Agent, or Firm* — Ascenda Law Group, PC

(57) ABSTRACT

A firearm includes a firing mechanism and a sensor device. The sensor device includes a subscriber identity module configured to communicate with a server over a signaling channel of a wireless communications network. The Sensor device is configured to enable/disable the firing mechanism in accordance with instructions received by the SIM from the server. Movements and/or attempted operations of the firearm may be monitored using an application running on a mobile device, which application receives information concerning the firearm over the signaling channel of the wireless communications network.

16 Claims, 2 Drawing Sheets

(56) References Cited

U.S. PATENT DOCUMENTS

| | | | |
|---|---|---|---|
| 6,415,542 B1* | 7/2002 | Bates et al. | 42/70.11 |
| 6,421,943 B1* | 7/2002 | Caulfield et al. | 42/70.11 |
| 6,429,769 B1* | 8/2002 | Fulgueira | 340/5.33 |
| 6,823,621 B2* | 11/2004 | Gotfried | 42/70.06 |
| 6,975,204 B1* | 12/2005 | Silver | 340/5.31 |
| 7,004,848 B2 | 2/2006 | Konow | |
| 7,594,416 B2* | 9/2009 | Bosin | E05B 37/0068 340/542 |
| 7,600,339 B2* | 10/2009 | Schumacher et al. | 42/70.01 |
| 7,703,229 B2* | 4/2010 | Parhofer | F41A 17/063 42/70.01 |
| 7,744,483 B2 | 6/2010 | Konow | |
| 7,849,624 B2* | 12/2010 | Holt et al. | 42/70.01 |
| 7,921,588 B2* | 4/2011 | Brown et al. | 42/70.01 |
| 8,046,948 B2* | 11/2011 | Mauch et al. | 42/70.01 |
| 8,127,482 B2* | 3/2012 | O'Shaughnessy et al. | 42/70.11 |
| 8,166,693 B2* | 5/2012 | Hughes et al. | 42/70.08 |
| 8,312,660 B1* | 11/2012 | Fujisaki | 42/70.11 |
| 8,339,257 B2 | 12/2012 | Cazanas et al. | |
| 8,931,195 B2* | 1/2015 | Milde, Jr. | F41A 35/00 42/66 |
| 8,947,252 B2 | 2/2015 | Wilson | |
| 8,966,797 B2* | 3/2015 | Carlson | F41A 17/063 42/1.01 |
| 2001/0033228 A1* | 10/2001 | Kisreman et al. | 340/568.1 |
| 2002/0032976 A1* | 3/2002 | Riener | 42/70.11 |
| 2002/0178635 A1* | 12/2002 | Martin | 42/70.11 |
| 2004/0098584 A1* | 5/2004 | Sherman et al. | 713/168 |
| 2005/0000139 A1* | 1/2005 | Mauch et al. | 42/70.01 |
| 2005/0066567 A1* | 3/2005 | Newkirk et al. | 42/70.11 |
| 2005/0188583 A1* | 9/2005 | Jackson et al. | 42/70.11 |
| 2005/0262751 A1* | 12/2005 | Leslie | 42/70.01 |
| 2006/0208857 A1* | 9/2006 | Wong | 340/5.82 |
| 2007/0074438 A1* | 4/2007 | Parhofer | F41A 17/063 42/70.01 |
| 2007/0180749 A1* | 8/2007 | Schumacher et al. | 42/70.01 |
| 2007/0271830 A1* | 11/2007 | Holt et al. | 42/70.01 |
| 2007/0271831 A1* | 11/2007 | Newkirk et al. | 42/70.01 |
| 2007/0277420 A1* | 12/2007 | Newkirk et al. | 42/70.01 |
| 2007/0284474 A1 | 12/2007 | Olson et al. | |
| 2008/0032268 A1* | 2/2008 | Farrell et al. | 434/16 |
| 2008/0092610 A1* | 4/2008 | Kuo | E05B 47/00 70/264 |
| 2008/0289237 A1* | 11/2008 | Pikielny | 42/70.11 |
| 2009/0037374 A1* | 2/2009 | Delia et al. | 707/3 |
| 2009/0064557 A1* | 3/2009 | Hughes et al. | 42/70.01 |
| 2011/0030262 A1* | 2/2011 | O'Shaughnessy et al. | 42/70.01 |
| 2011/0056108 A1* | 3/2011 | McCord et al. | 42/70.01 |
| 2011/0061280 A1* | 3/2011 | Emde et al. | 42/70.06 |
| 2011/0300944 A1* | 12/2011 | Raynal | 463/42 |
| 2012/0090038 A1* | 4/2012 | Pacella et al. | 726/30 |
| 2012/0142314 A1 | 6/2012 | Mohammed | |
| 2012/0329538 A1* | 12/2012 | Hall | 463/2 |
| 2013/0239453 A1* | 9/2013 | Trimble | 42/106 |

OTHER PUBLICATIONS

English language translation of WO2001/84069 A1 (Delsy Electronic Components AG).

Gunnegate, LLC; PCT/US2013/045002 filed Jun. 10, 2013; International Search Report and Written Opinion; ISA/KR; mailed Dec. 17, 2013; 14 pages.

European Telecommunications Standards Institute, "Digital cellular telecommunications system; Unstructured Supplementary Service Data (USSD)—Stage 2 (GSM 03.90)," Dec. 1996.

* cited by examiner

METHODS AND SYSTEMS FOR ENHANCING FIREARM SAFETY THROUGH WIRELESS NETWORK MONITORING

RELATED APPLICATION

This application is a Non-Provisional of and hereby claims the priority benefit of (a) U.S. Provisional Patent Application No. 61/853,179, filed Apr. 1, 2013, (b) U.S. Provisional Patent Application No. 61/853,971, filed Apr. 16, 2013, and (c) U.S. Provisional Application 61/825,985, filed May 21, 2013, each incorporated herein by reference.

FIELD OF THE INVENTION

The present invention relates to methods and systems for monitoring and, optionally, controlling, handheld firearms using embedded sensor devices that are configured to send and receive signals over a signaling channel of a wireless communications network.

BACKGROUND

Firearm safety is a topic of political and societal debate in the United States. Prior efforts to improve the safety of handheld firearms have included devices such as manual safeties, decockers, drop safeties, safety notches, firing pin blocks, hammer blocks, magazine disconnects, trigger guards, fingerprint sensors, loaded chamber indicators and even radio controlled proximity activation devices which permit operation of the firearm only when it is within range of a fob or similar device. While these devices offer varying degrees of physical safety, none are concerned with defining an area within and for which a firearm may be enabled or disabled from operation or with notifying an owner of an attempt to access, move or operate the owner's firearm. Further, no existing solutions communicatively couple a firearm to its owner via a wireless telecommunications network and a machine-to-machine ("M2M") component located within the firearm so as to control a firearm safety mechanism or its equivalent. Nor do any existing solutions establish a network-based (e.g., cloud-based) rule-set through which a firearm owner can establish and/or customize firearm control variables, such as a default trigger safety status. Further, no existing solutions enable a firearm owner to be provided with location, movement, and/or similar information regarding the location and/or status of the firearm (e.g., via a wireless communication network) and further enable the owner to disable the firearm via a user interface of a wireless device (e.g., mobile phone) applet.

BRIEF DESCRIPTION OF THE DRAWINGS

The present invention is illustrated by way of example, and not limitation, in the figures of the accompanying drawings in which.

DETAILED DESCRIPTION

Figure 1:
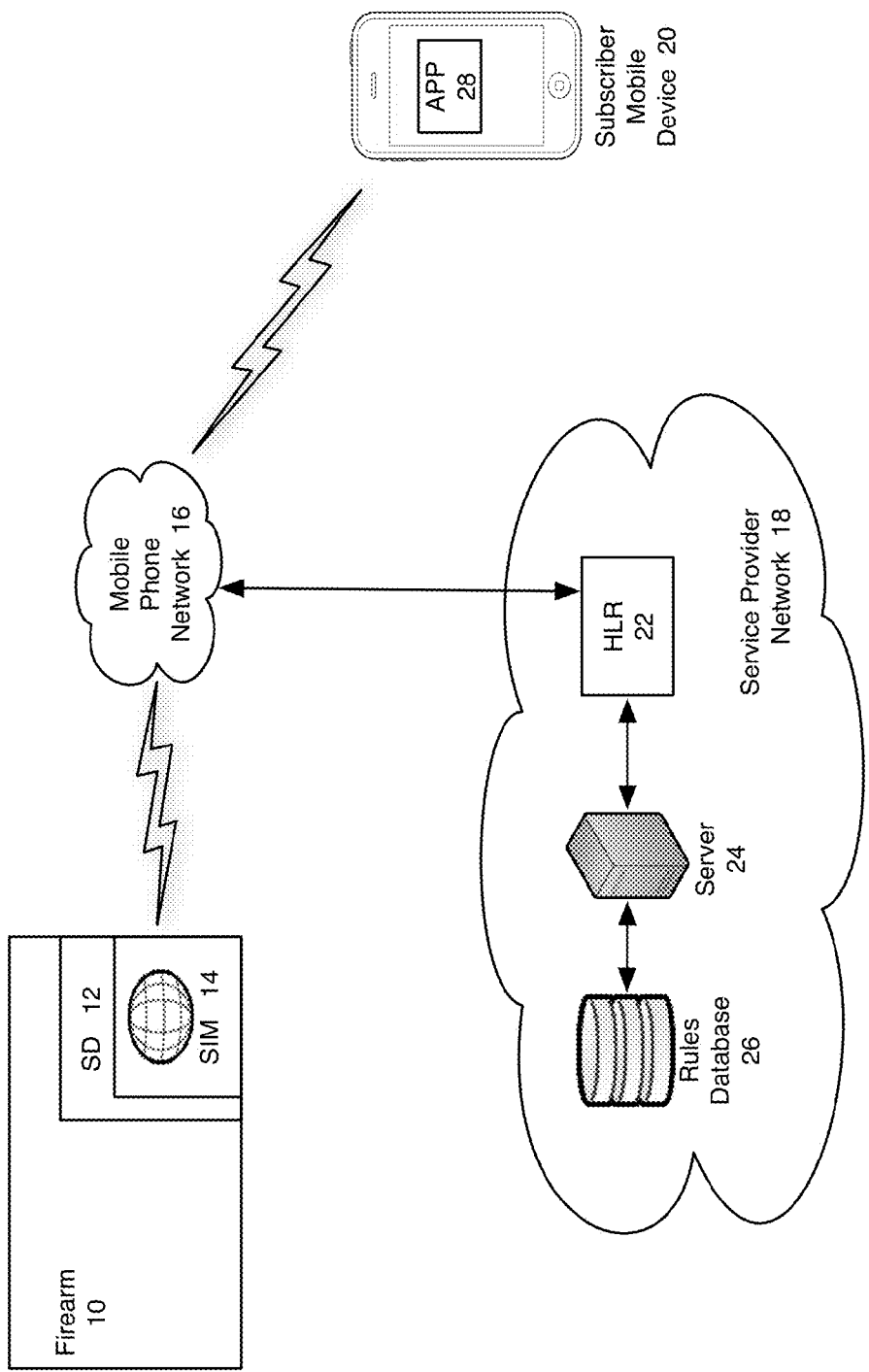
FIG. 1 illustrates an example of a system configured for monitoring and, optionally, controlling, a handheld firearm using an embedded sensor device configured to send and receive signals over a signaling channel of a wireless communications network in accordance with embodiments of the present invention.
Figure 2:
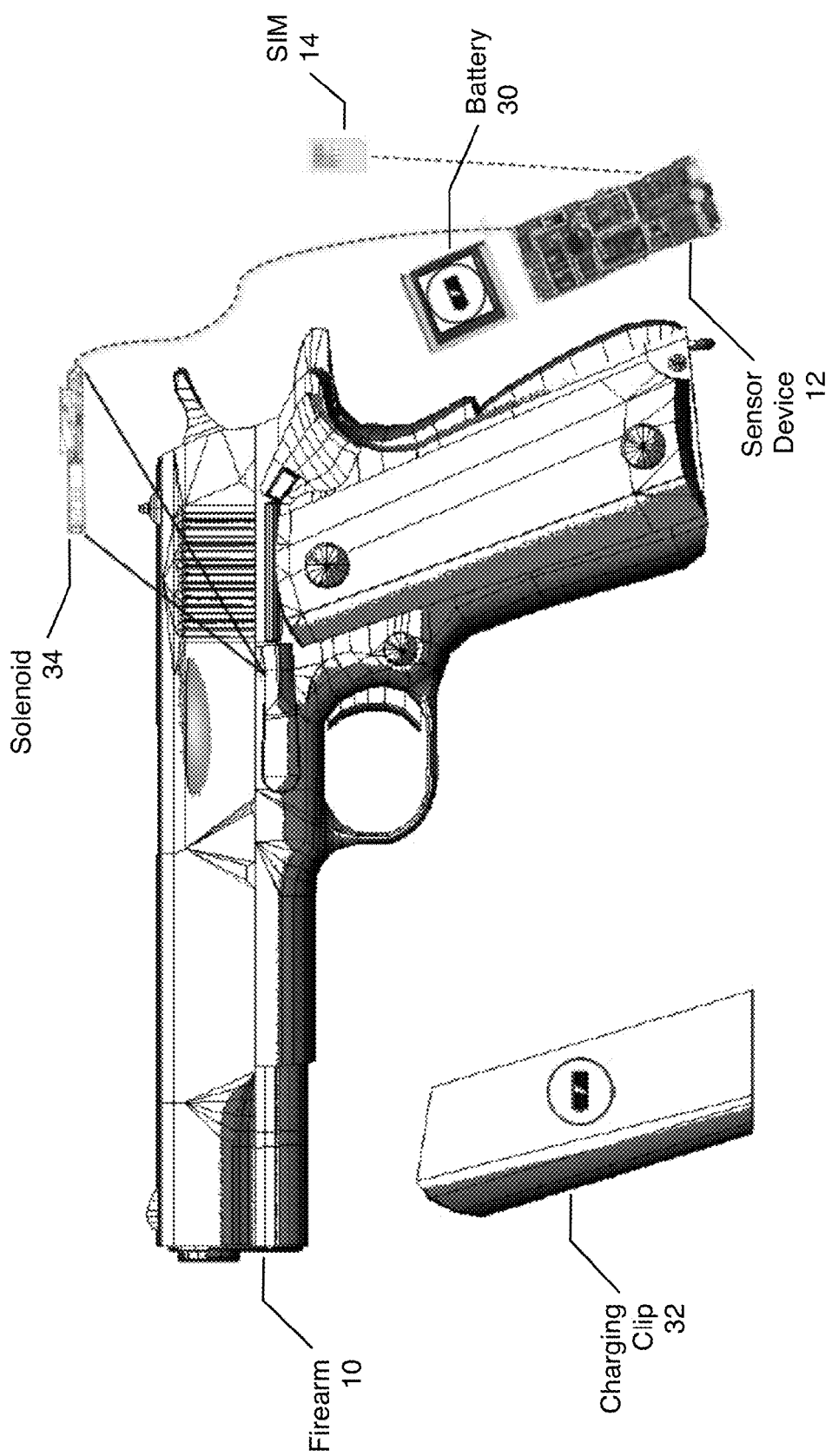
FIG. 2 illustrates an example of the placement of an embedded sensor device within a firearm, in accordance with an embodiment of the present invention.

In accordance with various embodiments of the present invention, methods and systems for monitoring and, optionally, controlling, handheld firearms make use of one or more embedded sensors that are configured to send and receive signals over a signaling channel of a wireless communications network. As illustrated in FIGS. 1 and 2, the sensor is fashioned as one element of a monitoring and safety component to include a subscriber identity module (SIM) 14 and associated wireless telephony, microprocessor, and solenoid functionality, which together can be described as a new type of machine-to-machine ("M2M") sensor device ("SD") 12 for integration within a respective firearm 10 in such a fashion as to act as an integrated electrical and mechanical gating device to control the function of a firing pin or equivalent, preventing the firearm from being fired in the absence of an authorization signal received by the SIM component of the device. Alternatively, or in addition, the sensor device may be configured to transmit a signal upon the respective firearm being moved and/or a safety mechanism being deactivated or mode selection mechanism being engaged.

Although intended primarily for use with handheld firearms, for example, pistols, revolvers, rifles, etc., the present invention may be adapted for use with any firearm. Therefore, as used herein, the term firearm should be understood as including handheld firearms and other firearms. Further, while the sensor device may be a separate module that is integrated into the firearm as an after-market accessory, in some instances the functionality provided by the sensor device may be integrated within the firearm at the time of its manufacture, either as a separate module or as an embedded part of the mode selection or safety mechanism. Therefore, the use of the terms sensor device is for convenience only and should be understood to include embedded modules and similar mechanisms.

As illustrated in FIG. 2, each sensor device may be integrated within a firearm and provided a power source. For example, the sensor device may include its own battery 30. The battery may be rechargeable, in which case facilities for recharging same may be integrated within the firearm. For example, the firearm may be configured with a port to permit coupling to an external power source to facilitate recharging of an integrated battery. In another example, a battery charger clip 32 may be provided as a temporary replacement of an ammo clip or magazine. The firearm owner may be notified via a mobile application of the type described further below of battery status. Recharging of the battery may then be accomplished by replacing an ammunition clip with the charging clip. The charging clip may include a battery, so as to recharge the battery 30 therefrom, and/or may include a transformer so as to recharge battery 30 from a power line outlet. In practice, the sensor device is designed to consume very little power so that recharging is needed only infrequently.

In one embodiment of the invention, the sensor device includes one or more integrated circuits, similar to that used in mobile phones, having an onboard microcontroller, random access and read only memory (which stores an operating system), and an electrically erasable programmable read only memory that stores personality information such as a unique identifier, e.g., an international mobile subscriber identity (IMSI), and a related cryptographic key that is used to identify and authenticate a subscriber on a mobile telephony network. The SIM may also store one or more of a unique serial number, a personal identification number (PIN) and a personal unblocking code (PUK) for unlocking the PIN. Other logical and physical characteristics of the SIM may be such so as to be compatible with European Telecommunications Standards Institute specification TS 11.11, and/or $3^{rd}$ Generation Partnership Project (3GPP) specification TS 51.011 and TS 31.102. Applications may also be stored on the SIM, for example applications such as those described herein which facilitate communications between the SIM and a mobile device. Application toolkits which facilitate development of such applications are described in various specifications of the 3GPP and ETSI and are well known in the art and so will not be repeated herein.

Importantly for purposes of the present invention, SIMs store network-specific information used to authenticate and identify subscribers on a mobile telephony network. These identifiers include an integrated circuit card identifier (IC-CID), which identifies both the issuer of the SIM as well as a unique account number (e.g., of the subscriber), and the IMSI, which identifies the SIM to the network. In operation, the SIM also stores network state information, including a location area identity (LAI), which is updated whenever the SIM changes locations.

As indicated above, the SIM, as a sub-component of a sensor device, is configured in accordance with embodiments of the present invention to transmit and receive signals over a dedicated signaling channel of a wireless telecommunications network. Such mechanisms are commonly referred to as common channel signaling, distinguishing them from channel associated signaling which involves transporting signaling information on the same channel as will ultimately carry a voice conversation. Common channel signaling provides a distinct advantage in that the path and facility used to transport the signaling information is distinct from the channels that carry voice conversations, allowing for significant performance improvements in both the time it takes to communicate the signaling information and the use of network facilities. In the United States, common channel signaling is usually referred to as signaling system 7 (SS-7), which refers to a set of standards defining telephony signaling protocols. Thus, the present invention makes use of the SS-7 signaling channel of a wireless telecommunications network, in one embodiment a Global System for Mobile Communications (GSM) telecommunications network.

In a GSM telecommunications network, a mobile switching center (MSC) is responsible for setting up and releasing end-to-end connections, based on signaling information received over the SS-7 signaling channel. The MSC is generally included within a mobile telephone switching office (MTSO) and is communicatively coupled to a home location register (HLR), a central database that stores information concerning each subscriber authorized to use the network. This information includes the IMSI associated with the SIM and the current LAI.

In accordance with the present invention, communications between a SIM and an HLR over the SS-7 signaling channel make use of USSD (Unstructured Supplementary Service Data) messages. USSD messages may be up to 182 alphanumeric characters per signaling packet. USSD messages create a real-time connection during a USSD session. The connection remains open, allowing a two-way exchange of data. This makes USSD sessions ideally suited as a communications vehicle between SIMs embedded in firearms and applications (e.g., instantiated on mobile phones and/or similar devices) configured to permit firearm owners to authorize or block the use of those firearms (e.g., by authorizing or preventing the release of the firearm's safety mechanism). FIG. 1 illustrates such a communication session. Some characters within the 182-character packet are otherwise un-used for transmission purposes and may be applied and used for transmission of sensor device related information sharing, such as battery status and for instructions signaling a solenoid 34 to enable or disable a trigger safety mechanism.

As shown, a firearm 10 with an SD 12 having an embedded SIM 14 that is configured in accordance with the present invention is communicatively coupled to a subscriber mobile device 20 over a wireless communications network 16. Details of the network 16 are not illustrated at this level; however, communications between the SIM 14 and an application 28 running on the mobile device 20 make use of the network's signaling channel rather than a voice or other channel. Application 28 is configured to provide alerts to the subscriber in response to SIM 14 signaling any movement or, optionally, attempted operation of the firearm 10 and allows the subscriber to track such movements and/or enable or disable such operation remotely.

In addition to communicating the movement/attempted operation information to the mobile device 14, the network components may be configured to alert other units. For example, in the case of firearms associated with a police force or similar unit, alerts may be provided to a central controller or watch commander. This may act as a monitoring means for deployment of officers' firearms and/or an early warning indicator of the use of those firearms. Similarly, gun clubs and other private organizations may monitor the movements and/or use of their firearms (or members' firearms on the premises) so as to ensure they are being used and/or transported within guidelines established by the respective organizations.

Also shown in FIG. 1 is network equipment associated with a provider that offers the firearm monitoring service that is the subject of the invention. In some instances, the service provider may be the same provider that operates the mobile phone network 16, but more often then not it will be a different service provider. The provider's network 18 is communicatively coupled to the mobile phone network 16 and includes an HLR configured as with subscriber information as described herein. Also included in the provider's network are one or more servers 24 and associated rules databases 26, which are configured to issue enable/disable commands to SIM 14 according to rules established by a subscriber and/or law enforcement personnel and information received from SIM 14. For example, based on information from SIM 14, the server 24 may determine whether the firearm 10 is located within a permitted operating area established by the subscriber. If so, the server may issue an enable command to SIM 14, permitting the use of the firearm. If, however, the firearm is determined to be outside the permitted area of operation, the server may be configured to prevent firing of the firearm, e.g., by sending a disable signal to the SIM 14. Alternatively, such "geo-fences" may be established to prevent firearm operation within a designated area (such as a building and is associated grounds, a park, etc.). These baseline enable/disable instructions may be overridden by a subscriber through use of the application 28. Note that although server 24 and rules database 26 are shown separately, the functions of these units may be included, in some embodiments, within HLR 22.

Because different firearms have different safety mechanisms, a detailed discussion of such mechanisms is not included herein. For purposes of the present invention, it is sufficient to recognize that virtually all firearms include such safety mechanisms and it is intended that in some embodiments of the invention the present sensor device 12 will be included in a firing enable pathway and use a solenoid 34 so as to act as an electrical-mechanical trigger safety gating means to permit or prevent such firing. In some instances this may require retrofitting of the firearm to include a suitable firing detent mechanism that can be enabled or disabled through an electronic signal from the sensor device. In other instances, new firearms may be designed and constructed for inclusion of such enable/disable means. For firearms with electrical firing mechanisms, the sensor device may be coupled to a switch in an electrical pathway in the firing mechanism and may be used to close or open the switch in accordance with firing authorization having been received or not. The sensor device may be self-contained, and may include one or more microprocessors, motion sensors, SIM/wireless telephony units, solenoids, and "blocking" or "gating" means as well as a power source.

As part of the integrated functionality, a simple obstruction to the firing pin mechanism or equivalent is introduced. More specifically, in one embodiment of the invention a blocking or gating means (which in one embodiment may be a cylindrical metal bar or rod) moves along an axis between a safety position and a firing position initiated by the action of a solenoid (energized/not energized), responsive to communications via the electronic components of the sensor device (e.g., an electrical pulse). The blocking or gating means is movable between a first position, where the firing pin is operable to discharge the firearm, to a second position, where it is not. A first electric pulse causes the solenoid to move the blocking or gating means from the first position to the second, and a second electric pulse causes solenoid to return the blocking or gating means to its original position.

The SIM communicatively couples the sensor device over a wireless network to a cloud-based platform (e.g., an HLR) that includes computer-based decision-making and database rule-sets for signaling information. The cloud-based platform is further communicatively coupled (e.g., over a wireless network) to a mobile device (such as a smart phone), which includes a firearm monitoring and safety application. The mobile device application enables the firearm owner or other user to communicate with the sensor device, for example to receive status information such as alerts produced by motion sensors included in the sensor device responsive to movement of the firearm. The user can respond to such alerts via a user interface of the mobile device application, for example to cause the solenoid to move the blocking or gating means to move between the first position and the second, and vice versa.

In other embodiments, the sensor device may be enabled solely for purposes of tracking the location of the firearm and may not play a role in enabling or disabling the firing of the weapon.

In operation, when a sensor device configured in accordance with the present invention is powered on, it enters an initialization mode in which the SIM searches for a nearest base transceiver station (BTS) of a wireless telecommunications network. To facilitate communications between the SIM and the network equipment, the sensor device may include a radio transceiver and an antenna configured within the firearm, such as extending within the firearm grip. The antenna may be located at or near the exterior surface of the firearm and/or may have an exposed portion thereof so as to provide for a robust communication pathway.

In the initialization mode, the SIM included in the Sensor device scans for a signal from one or more BTS signals and, if there is more than one, will generally select the one with the strongest received signal strength and that has a system identifier indicating compatibility with the SIM's network operator. The system identifier is typically broadcast by a BTS on a control channel. Once a BTS has been selected, the SIM will register with the network and, if the carrier that operates this network is not the same carrier as operates the firearm monitoring service of the present invention, the network operator will signal (using an SS-7 channel) the appropriate home carrier (i.e., the carrier associated with the present firearm monitoring service).

Network registration may vary depending on the country and/or carriers involved, but generally will include the SIM selecting a channel slot for transmission and, through the use of the SD radio transceiver, using the signal control path to transmit its associated phone number and IMSI to the BTS. The BTS forwards the signaling information to the local network operator's MTSO, which initiates a handshake with the SIM. The SIM responds with its unique authentication key, which is then used for encrypting and authenticating all further communications between the SIM and the MTSO. While a SIM is powered on, network registration is automatic and ongoing, occurring every several seconds and lasting only a few milliseconds. Power consumption during such registration operations is minimal.

The SS-7 protocol for SIM network registration includes specific signaling packet length(s), field(s) identity, and character length, and in addition to phone number and IMSI, the fields include a "message waiting indicator" and "feature request." These fields may be used in accordance with the present invention for communication of some of the information required for geospatial location awareness and an "enable" or "disable" instruction from server 24 over the SS-7 signaling channel.

Mobile communications between the BTS and the SD occurs through the use of radio signaling transmissions, using a full-duplex configuration and separate transmit and receive frequencies. The BTS transmits on the frequency that the SD receiver is tuned to, while the SD transmits on the radio frequency that the BTS receiver is tuned to. The BTS acts as a conduit for information transfer between the SIM and the MTSO. Subscriber-specific information for use by the MTSO is contained in the HLR, which also performs an important role in tracking the SIM as it moves around the network. In one embodiment, this tracking involves the use of LAI information stored by the SIM.

During registration, the SIM stores network state information, including the LAI, received from the BTS. When the SIM changes location and/or the mode of the firearm is changed (e.g., going from a "safe" mode to a "fire" mode or a "single shot" mode to a "semi-automatic" mode, etc.), the SIM stores the new LAI. Further, in accordance with the present invention, the SIM encrypts the LAI and stores it in a dial buffer of the device.

Thereafter, and periodically, server 24 operated by the firearm monitoring service provider may attempt to place a voice call to the SIM. This is done using the SIM information stored in the HLR. The SIM, however, is configured not to accept voice calls and responds to the attempt with a "do-not-allow" or "wink-back" message. In accordance with the present invention, this message includes the contents of the dial buffer; i.e., the encrypted LAI. At server 24, the dial buffer information is combined with the information gleaned from an SS-7 "location request" solicited by the server to provide detailed location information for the SIM (i.e., for the associated firearm). Because no actual voice or data transmission occurs power consumption is minimized in these transactions. In some instances, Global Positioning System (GPS) information may be included in addition to LAI in order to further define the location of the firearm. The GPS information may be associated with the firearm (if so equipped) and/or with the BTS in communication with the SIM.

To facilitate the operations described herein, the service provider's HLR 22 is configured to include parameters useful for monitoring firearms, which parameters may include but are not limited to: name of registrant (often, though not necessarily the firearm owner), purchase date, make and type of firearm, location purchased, description of authorized use areas (i.e., description of geo-fence boundaries), description of authorized use dates and/or times (e.g., times-of-day/days-of-week, etc.). An associated database 26 is configured with rule sets that define messages to be sent to a SIM. For example, rules that are based on HLR parameters defining geo-fences and/or use dates and/or times may be provided. When information from a SIM is received at the server, the server consults the HLR to retrieve the associated use parameters for the SIM and issues instructions in accordance with those parameters. For example, in the case of a subscriber that has defined permitted uses of a firearm to be on weekends from 09:00 to 11:00, upon receipt of a signal from a SIM indicating that a safety has been disabled, the server will retrieve the associated parameters from the HLR, compare the permitted use days/times with the current day/time and issue an enable or disable instruction to the SIM accordingly. Similar enable/disable instructions based on geo-fence rule sets and decisions based upon real-time receipt of SIM location information may also be dispatched. Logs of such decisions and instructions may be kept for later review and assessment.

Ideally, the HLR and any associated database are accessible only via authenticated accesses by the firearm owner and/or authorized individuals. In some countries, law enforcement personnel may be permitted to access and/or override certain parameters. For example, in some countries, law enforcement personnel or governmental authorities may be able to enforce firearm-free zones through one or more default HLR parameters applied to all firearms registered with the service provider. Changes in HLR parameters may, in some circumstances, also be subject to "waiting periods" in order to permit review by law enforcement or other government authorities.

Application 28 running on the subscriber's mobile device 20 may be used to configure the geo-fences and other parameters stored at the HLR 22. In addition, the application may be used to receive location information concerning the SIM 14. For example, subscribers may use the application to poll the HLR 22 for current location information and/or may receive alerts when location updates are received by the HLR in response to detected movements of the firearm 10.

Such movements may be detected using any of a number of movement sensors. For example, presently available sensors that respond to physical movement include solid state accelerometers and motion/vibration sensors that consist of two adjacent contacts that make contact with one another when the assembly is moved. Other forms of conventional motion sensors include mercury (or other conductive liquid) switches and sensors (switches) that replace the conductive liquid with a conductive sphere, typically a ball bearing. In the context of the present invention, a preferred motion sensor is in the form of a dry contact switch for direct interconnection to the inputs of a microprocessor (such as the controller of the SIM), which switch requires no electrical current for its operation. A multiplicity of contacts, arranged in all planes within one sensor assembly, is capable of detecting motion in any plane.

The present motion sensor may be included as part of the Sensor device and may include a spherical, electrically conductive sphere (made of any suitable material), which sphere is surrounded by a multiplicity of electrical contacts spaced apart by a distance slightly greater than the diameter of the sphere. The construction of the sensor is such that there is no place where the sphere can rest without making contact with at least one of the electrical contacts. This may be accomplished by providing a slightly convex surface on the contact face causing the ball to roll to one side or another, unable to remain in place without touching another contact. It is envisioned that in some embodiments, the sphere will be surrounded by six convex contacts forming a cube around the ball. The sphere will always be in contact with at least two of the contacts at any time. Any movement of the sensor (i.e., the firearm) will cause the sphere to roll to a different set of contacts. The controller will detect any changes in state of the contacts thus signaling movement of the sensor (firearm). Such construction of the sensor requires no power source and can be created in a very miniature size construct, and as such is ideal for the firearm application.

The SIM may be activated (powered on) in response to movement being detected. Alternatively, or in addition, the SIM may be configured to send a signaling message upon such movement being detected. In response, the server 24 consults the appropriate rules and sends an enable/disable signal as appropriate. In some embodiments, the SIM message is also transmitted to the mobile device and application 28, and the user can, if necessary override any enable/disable instructions from the server. Instructions from application 28 are provided to the SIM 14 using USSD messages during a USSD session.

The computer- or controller-based devices described herein generally will include includes a bus or other communication mechanism for communicating information, and a processor coupled with the bus for processing information. Such devices also will include main memory, such as a RAM or other dynamic storage device, coupled to the bus for storing information and instructions to be executed by processor. Main memory also may be used for storing temporary variables or other intermediate information during execution of instructions to be executed by processor. Such devices further will include a ROM or other static storage device coupled to the bus for storing information and instructions for the processor. A storage device, such as a hard disk or flash drive, may also be provided and coupled to the bus for storing information and instructions. Execution of the sequences of instructions contained in the main memory, ROM and/or storage device causes the processor to perform the process steps described herein. Such devices also include a communication interface coupled to the bus, which communication interface provides a two-way data communication path as is known in the art. For example, such a communication interface may be a local area network (LAN) interface to provide a data communication connection to a compatible LAN.

Thus, methods and systems for monitoring and, optionally, controlling, handheld firearms that make use of one or more embedded sensors configured to send and receive signals over a signaling channel of a wireless communications network have been described. In various embodiments, the present invention provides a safety mechanism for a firearm in which a SIM is used as a communications gateway to and from the firearm and, optionally, a decision-gate in the firing enable path thereof. The use of a SIM, which may be activated in response to movement of the firearm or an attempt to release the safety mechanism of the firearm, facilitates cloud-based control of the operation of the firearm, for example using server-based rules that enable/disable operation of the firearm via messages exchanged with the SIM over the signaling channel of a wireless communications network. Enable/disable rules (and the associated messages) may be based on a variety of parameters, including but not limited to location awareness, established geo-fences, times-of-day, days-of-week, and detected movement of the firearm. The cloud-based resources also permit logging of any use, attempted use and/or location information concerning the firearm.

In some embodiments, the cloud-based system includes an HLR configured for assembling, analyzing, performing artificial intelligence decision-making, reporting, requesting information, determining location, exchanging information, and so forth, in conjunction with one or more firearm safety devices enabled by SIMs configured in accordance with the present invention. Communications between the HLR and the SIMs may be over an SS-7 signaling channel and through USSD protocol means as described above. The HLR-SIM communications acts as a remote control over the firearm, enabling or preventing firing of the weapon in accordance with rules established by the firearm owner or other serve subscriber. In addition, a mobile device-based application facilitates subscriber control over and configuration of the monitoring system, allowing user override of enable/disable commands where necessary.

What is claimed is:

1. A firearm, comprising a firing mechanism and a sensor device, the sensor device including a subscriber identity module (SIM) that reports an attempted operation of the firearm to a server using unstructured supplementary service data (USSD) messages transmitted over a common channel signaling channel of a wireless communications network, wherein the sensor device further detects a safety mechanism of the firearm being deactivated and reports said detection from the SIM to the server using USSD messages over the common channel signaling channel of a wireless communications network in response to said detection and stores undated location area identity (LAI) information received from a base transceiver station (BTS) via the wireless communications network in a dial buffer the SIM.

2. The firearm of claim 1, wherein the sensor device is configured to enable or disable the firing mechanism of the firearm in accordance with instructions received by the SIM from the server.

3. The firearm of claim 1, wherein the SIM comprises a SIM configured to communicate over a Global Systems for Mobile Communications (GSM) network.

4. The firearm of claim 1, wherein the signaling channel is a signaling systems 7 (SS-7) signaling channel of a mobile telecommunications network.

5. The firearm of claim 1, wherein the SIM is configured to send information to the server upon the motion sensor detecting movement of the firearm.

6. The firearm of claim 1, wherein the SIM is configured to respond to attempted voice communications from the server by returning information stored in a dial buffer of the SIM.

7. A system, comprising a sensor device of a firearm including a subscriber identity module (SIM), and a home location register (HLR) storing information concerning the SIM, the SIM reporting an attempted operation of the firearm to the HLR using unstructured supplementary service data (USSD) messages transmitted over a common channel signaling channel of a wireless communications network, wherein the sensor device further detects a safety mechanism of the firearm being deactivated and reports said detection from the SIM to the HLR using USSD messages over the common channel signaling channel of a wireless communications network in response to said detection and stores updated location area identity (LAI) information received from a base transceiver station (BTS) via the wireless communications network in a buffer of the SIM.

8. The system of claim 7, wherein the HLR stores some or all of: information concerning permitted times and/or days for operation of the firearm, and geo-fence information for the firearm.

9. The system of claim 7, further comprising an application running on a mobile device, the application configured to communicate with the SIM over the signaling channel of the wireless communications network.

10. The system of claim 7, wherein the sensor device is configured to enable/disable operation of the firearm in accordance with instructions received by the SIM from the HLR.

11. The system of claim 9, wherein the sensor device is configured to enable/disable operation of the firearm in accordance with instructions received by the SIM from the application.

12. A firearm, comprising a sensor that includes a subscriber identity module (SIM) configured to communicate with a home location register (HLR) storing information concerning the SIM, the SIM reporting an attempted operation of the firearm to the HLR using unstructured supplementary service data (USSD) messages transmitted over a common channel signaling channel of a wireless communications network, a controller coupled to receive signals from the SIM, and a solenoid coupled to receive signals from the controller and responsive to said signals to cause a blocking or gating means of the firearm to move from a first position to a second position or vice-versa, detects a safety mechanism of the firearm being deactivated and reports said detection from the SIM to the HLR using USSD messages over the common channel signaling channel of a wireless communications network in response to said detection and stores updated location area identity (LAI) information received from a base transceiver station (BTS) via the wireless communications network in a dial buffer of the SIM.

13. The firearm of claim 12, further comprising a rechargeable power source.

14. The firearm of claim 13 further configured to receive a charging clip.

15. The firearm of claim 1, further comprising a solenoid coupled to receive signals from the sensor device and responsive to said signals to cause a blocking or gating means of the firearm to move from a first position to a second position or vice-versa.

16. The system of claim 7 wherein the firearm further includes a solenoid coupled to be responsive to signals received by the SIM from the HLR, and to cause a blocking or gating means of the firearm to move from a first position to a second position or vice-versa.

* * * * *